Patented Aug. 4, 1953

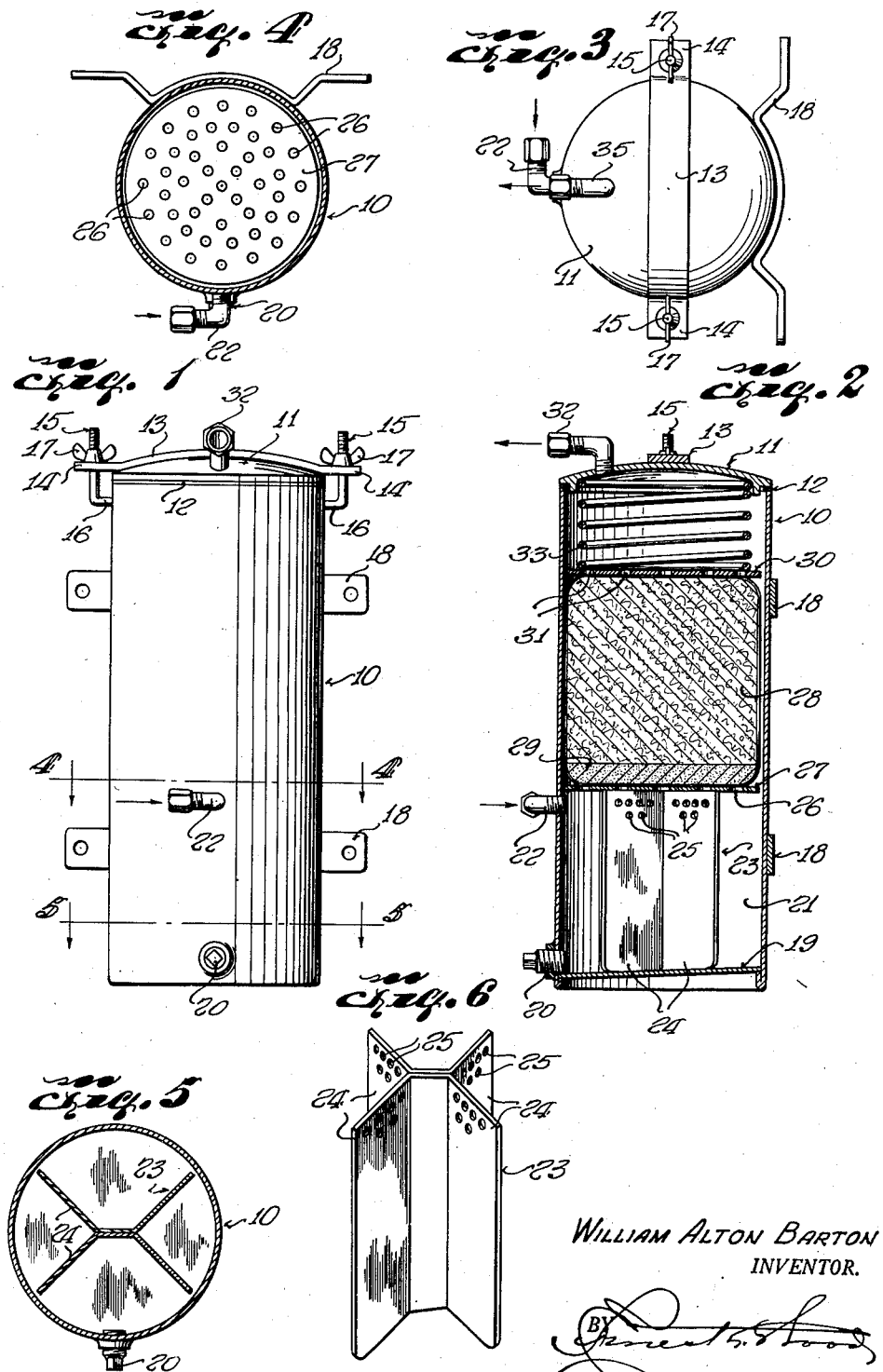

2,647,634

UNITED STATES PATENT OFFICE 2,647,634

OIL CLEANER FOR INTERNAL-COMBUSTION ENGINES

William Alton Barton, Arlington, Tex., assignor to Benjamin G. Barnett, Dallas, Tex.

Application September 18, 1950, Serial No. 185,395

1 Claim. (Cl. 210—134)

This invention relates to a device for cleaning lubricating oil during its circulation through an internal combustion engine and it has particular reference to an oil cleaning and purifying device having removable and interchangeable filters.

The principal object of the invention is to provide an oil cleaner through which the oil is circulated under pressure of the oil pump employed for circulating the oil through the engine and in its course through the oil cleaner, the oil is deprived of entrained foreign substances, including water which are, for the most part, precipitated into a sediment chamber situated below a composite filter unit, which latter is effective to remove remaining foreign matter from the oil as it is forced under pressure upwardly through the filter and returned to the lubricating system of the engine.

Conventional oil cleaners or filters, for the most part, are so designed and constructed that the dirt laden oil enters above the filter unit and penetrates the latter by gravity and is thrown off below the filter unit for recirculation in the engine. In this manner of passing the dirty oil through the filter much of the small entrained dirt will continue through the filter with the oil and will be conveyed thereby back into the engine, along with some of the foreign matter collecting in the bottom of the filter casing, due to the turbulence set up by the oil in its passage through the filter.

It is therefore an important object of the invention to provide an oil cleaner having a filter through which the oil is forced counter to the action of gravity, which latter is an aid in extracting foreign matter from the oil. Moreover, the invention provides a system of baffles in the sediment chamber whose presence is no hindrance to the passage of oil upwardly through the filter unit but it prohibits turbulence in the sediment chamber which would cause reentrainment of disturbed foreign matter with the oil in its passage into and through the filter unit.

With the foregoing objects in view, the invention has further reference to certain features of accomplishment which will become apparent as the description proceeds, taken in connection with the accompanying drawing wherein:

Figure 1 is a side elevational view of an oil cleaner constructed according to the present invention.

Figure 2 is a vertical sectional view.

Figure 3 is a top plan view of the oil cleaner.

Figure 4 is a view in transverse section taken on line 4—4 of Figure 1.

Figure 5 is a transverse sectional view taken on line 5—5 of Figure 1, and

Figure 6 is a perspective view of the baffle adapted to be disposed in the sediment chamber of the oil filter.

Continuing with a more detailed description of the drawing, reference numeral 10 denotes the cylindrical shell or casing of the oil cleaner, having a slightly convex top or cover 11 which is in sealing relationship with the top of the casing 10 by virtue of an annular gasket 12 interposed between the top and casing. A cover retaining strap or yoke 13 is disposed diametrically across the cover 11 in flush engagement therewith and its ends 14 extend slightly beyond the edges of the cover and are perforated to receive the threaded upper ends of bolts 15, whose lower ends 16 are turned inwardly and are affixed to the walls of the casing 10 in diametrically opposed relationship. Wing nuts 17 are threaded onto the bolts 15 and are adapted to bear against the ends 14 of the yoke 13, thus to hold the cover 11 firmly in place on the top of the casing 10.

Attached in longitudinally spaced relationship to one side of the casing 10 is a pair of brackets 18 by which the oil cleaner is secured to some suitable location adjacent to the engine.

In the lower end of the casing 10 is secured a bottom 19 which is slightly inclined in relation to a threaded drain plug 20, the latter being removable for the purpose of draining the sediment chamber 21 of foreign matter precipitated out of the oil as the latter enters the upper portion of the sediment chamber 21 through the connection 22, under pressure of the oil pump of the engine.

Arranged in the sediment chamber 21 is a baffle, generally indicated by the reference numeral 23 and shown separately in Figure 6. This baffle is made up preferably of two metal sheets, each bent into substantially V-shape and secured together in back to back relationship to form a plurality of wings 24 which extend outwardly but are short of the inner surfaces of the casing 10 in order to retard but not block the circular passage of oil in the sediment chamber and thus preclude the setting up of turbulence within the chamber sufficient to disturb foreign matter collecting in the bottom of the chamber. Adjacent the top of the baffle 23, wings 24 are provided with a group of holes 25 through which the oil may pass preliminary to its being forced under pump pressure through the aperture 26 in a circular plate 27, resting on top of the baffle 23 and adapted to support a composite filter cartridge 28.

The filter cartridge 28 is made up of any suitable form of fibrous material known to possess the quality to retard impurities entrained in the oil circulated therethrough and, in addition to the fibrous material of the filter, there is provided at its lower end a filter section 29 of finely divided material such, for example as fuller's earth, which is effective to prevent passage with the oil of droplets of water which become associated with the oil in the engine crank case due to condensation on the walls thereof. Extraction of water from the oil is important since presence of moisture is deleterious to the mechanism of the engine.

Disposed on top of the filter unit 28 is another circular plate 30 similar to the plate 27. The plate 30 also is provided with apertures 31, through which oil emerging from the filter 28 passes into the upper portion of the casing 10 and through the fitting 32 back to the engine. Disposed between the plate 30 and the cover 11 of the casing 10 is a coil spring 33. The upper end of the spring bears against the underside of the cover 11 while the lower end thereof bears against the plate 30, keeping the filter cartridge 28 always under compression.

In operation, the casing 10 is mounted in convenient relationship with the engine so that a conduit connection can be made between fitting 22 and the pressure side of the oil pump of the engine. A similar connection is made between a fitting 32 and the engine on the suction side of the pump. In this manner lubricating oil which has been circulated in the engine is caused to be passed into the chamber 21 of the oil cleaner. The velocity of the oil under pump pressure is retarded by the baffle 23 yet the presence of the baffle does not prevent distribution of the oil throughout all of the compartments of the chamber 21 defined by the wings 24 of the baffle, which permit of precipitation of a considerable amount of foreign matter entrained in the oil into the sediment chamber 21 preliminary to the passage of the oil upwardly through the primary filtering medium 29 and thence through the secondary filtering medium 28 which effects further removal of impurities from the oil. The oil thus purified is then passed through fitting 32 and conduit connection back to the engine for recirculation. The compression spring 33 resists tendency of the filter units 28 and 29 to move upwardly in the casing 10 under pressure of the oil passing therethrough and causes the filter to return to seated position on the separator plate 27 when the oil ceases to circulate through the filter upon stopping the engine.

Manifestly, the construction as shown and described is capable of some modification and such modification as may be construed to fall within the scope and meaning of the appended claim is also considered to be within the spirit and intent of the invention.

What is claimed is:

An oil cleaner for an internal combustion engine in combination with the oil pump thereof, comprising a cylinder having an inclined bottom and a cover in sealing engagement with the top thereof, a drain plug entering through the wall of said cylinder adjacent the lowest portion of said inclined bottom, a baffle disposed on said inclined bottom of said casing of a length equal to substantially one-third the length of said cylinder and having a plurality of radially extending wings, a perforated plate disposed on the top of said baffle and defining in the lower portion of said casing a sediment chamber, the wings of said baffle being co-extensive with said sediment chamber and dividing said chamber into separate compartments, said wings having perforations adjacent their upper ends for distribution throughout said compartments of oil flowing into said sediment chamber, an oil inlet entering said sediment chamber adjacent the top thereof on substantially the same plane with said perforation and having a connection with the oil pump of said engine on the pressure side thereof and adapted to direct oil under pressure against the upper portion of said baffle to reduce the velocity thereof, a filter cartridge supported on said perforated plate, said cartridge having a lower section of fibrous material and an upper contiguous section of fuller's earth, a second perforated plate supported on the top of said filter cartridge, a compression spring having its upper end bearing against said casing cover and its lower end bearing against said second perforated plate to hold said filter cartridge under compression and means entering said casing cover for conveying oil to said engine subsequent to its passage through said filter cartridge.

WILLIAM ALTON BARTON.

References Cited in the file of this patent

UNITED STATES PATENTS

| Number | Name | Date |
|---|---|---|
| 197,428 | Thierman | Nov. 20, 1877 |
| 999,759 | Dondey et al. | Aug. 8, 1911 |
| 1,468,906 | Inman | Sept. 25, 1923 |
| 1,609,856 | Blackman | Dec. 7, 1926 |
| 1,685,655 | Wenzka | Sept. 25, 1928 |
| 1,723,374 | Roehr | Aug. 6, 1929 |
| 1,910,747 | Burhans | May 23, 1933 |
| 2,064,097 | White | Dec. 15, 1936 |
| 2,070,202 | Gordon | Feb. 9, 1937 |
| 2,072,393 | Briggs | Mar. 2, 1937 |
| 2,280,033 | Aldham | Apr. 14, 1942 |
| 2,369,857 | Russell et al. | Feb. 20, 1945 |